(12) United States Patent
Finocchio

(10) Patent No.: US 6,859,920 B1
(45) Date of Patent: Feb. 22, 2005

(54) SYSTEM AND METHOD FOR IMPLEMENTING A DEPENDENCY BASED PROPERTY SYSTEM WITH COALESCING

(75) Inventor: Mark J. Finocchio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 10/001,641

(22) Filed: Oct. 30, 2001

Related U.S. Application Data

(60) Provisional application No. 60/244,286, filed on Oct. 30, 2000.

(51) Int. Cl.[7] .................................................. G06F 9/44
(52) U.S. Cl. ........................ 717/108; 717/116; 717/165; 719/316; 707/103 R
(58) Field of Search ................................ 717/104, 108, 717/109, 116, 165; 707/100, 103 R; 706/11; 719/316, 328

(56) References Cited

U.S. PATENT DOCUMENTS

| | | | | |
|---|---|---|---|---|
| 5,732,271 A | * | 3/1998 | Berry et al. ................ | 719/316 |
| 5,978,582 A | * | 11/1999 | McDonald et al. ......... | 717/104 |
| 6,275,828 B1 | * | 8/2001 | Lee et al. ................... | 717/116 |
| 6,336,211 B1 | * | 1/2002 | Soe ............................. | 717/108 |
| 6,480,856 B1 | * | 11/2002 | McDonald et al. ......... | 707/100 |
| 6,625,610 B1 | * | 9/2003 | Siegel et al. ................ | 707/102 |
| 6,678,880 B1 | * | 1/2004 | Roddy ........................ | 717/108 |
| 6,694,506 B1 | * | 2/2004 | LeBlanc et al. ............ | 717/108 |
| 6,701,513 B1 | * | 3/2004 | Bailey ........................ | 717/109 |
| 6,745,168 B1 | * | 6/2004 | Enomoto .................... | 706/11 |
| 6,792,462 B2 | * | 9/2004 | Bernhardt et al. .......... | 709/225 |

OTHER PUBLICATIONS

Title: Evolution of Object Behavior using Context relations, author: Seiter et al, ACM, 1996.*
Title: A Simple Software Environment Based on Objects and Relations, author: MacLennan, ACM, 1985.*

* cited by examiner

*Primary Examiner*—Chameli C. Das
(74) *Attorney, Agent, or Firm*—Christensen O'Connor Johnson Kindness PLLC

(57) ABSTRACT

A method and system for declarative user interface dependency-based object property system are provided. A source object property change is obtained. Steady-state values for all dependent properties are obtained. Any dependent properties whose value is not affected by the source property change are eliminated or which are duplicate properties are eliminated. The remaining steady-state post modification dependent object property changes are implemented.

48 Claims, 11 Drawing Sheets

```
<STYLE>
    BUTTON                          102
    {
        BORDERSTYLE: RAISED;
    }
    BUTTON [PRESSED]                104
    {
        BORDERSTYLE: SUNKEN;
    }
</STYLE>
```

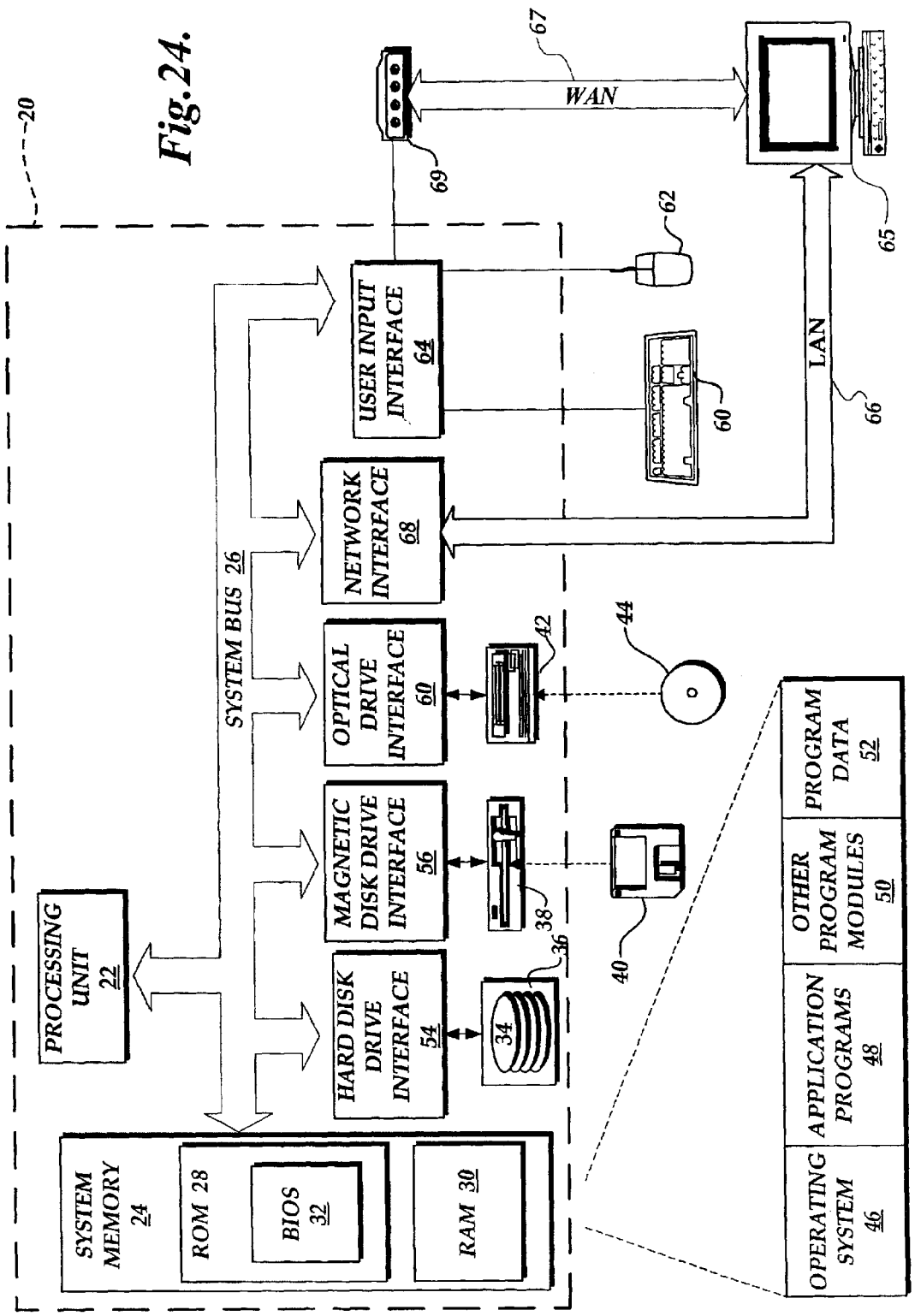

SYSTEM AND METHOD FOR IMPLEMENTING A DEPENDENCY BASED PROPERTY SYSTEM WITH COALESCING

CROSS-REFERENCE TO RELATED APPLICATION

This application claims the benefit of U.S. Provisional Application No. 60/244,286, entitled METHOD AND SYSTEM FOR IMPLEMENTING A DEPENDENCY-BASED PROPERTY SYSTEM WITH COALESCING, filed Oct. 30, 2000. U.S. Provisional Application No. 60/244,286 is incorporated by reference herein.

FIELD OF THE INVENTION

In general, the present invention relates to computer software, and in particular, to a method and system for processing user interface object property changes.

BACKGROUND OF THE INVENTION

Generally described, computer devices, such as personal computing devices ("PCs"), computing terminals, hand-held computers, mobile devices, and the like, provide a user with a variety of data processing functions. By utilizing various software applications resident on a computing device, the computing device can allow a user to communicate with other computing devices, to access information via a computer network, and/or to process data. To better facilitate interaction with a user, or group of users, the software applications can generates one or more user interfaces that are displayed on a computer display and interact with the user.

In one approach to a user interface, the user interface is limited to a text-based interface, in which a user manually enters commands to the software application via a computer keyboard. Text-based interfaces are inefficient, however, because they typically require the user to learn, and often memorize, a command language. Moreover, text-based interfaces require a user to be efficient in manipulating a keyboard. Another approach to a user interface involves a combination of graphical icons and text, which is generally referred to as a graphical-user interface ("GUI").

In one GUI embodiment, a software application being executed by the computing device generates instructions to a computer device operating system that results in the display of graphical images and text, such as icons, images, colors, and animation, within a rectangular window displayed on the computer display. A user can interact with the software application by manipulating the GUI with a selection device, such as a computer mouse or a touch-screen. Often, the user is not required to memorize any textual commands and many GUIs share common interface functionality. For example, any number of software applications may utilize the same graphical icon depicting a computer printer to allow a user to print material by manipulating the printer graphical icon. As the user manipulates the GUI, the user's actions are interpreted by the computing device operating system and relayed to the corresponding software application. The user's action can result in a modification of the GUI, such as the depression of a button icon, and can further result in the initiation of an action by either the operating system and/or the software application.

One skilled in the relevant art will appreciate that a GUI can be represented in terms of a rich user interface programming framework that includes instances of a number of user interface objects ("UI object"), such as a display object. In turn, each instance of a UI object can be defined by various object characteristics, which are represented in the UI as UI object properties. For example, a GUI may include a number of identical UI objects, such as a graphical button that can be depressed by manipulating a mouse. However, each instance of the UI button object in the GUI may be defined as having specific, and often distinguishing property values, such as dimension, color, opacity, and the like. Accordingly, the UI object is defined, and represented on the computer display by the operating system, in terms of its characteristic property values (e.g., large, red, 50%).

In dynamic GUI, one or more of the UI object properties can be dependent on the value of another UI object property. For example, the width of a UI object may be defined mathematically in terms of being twice its length. Additionally, a UI object property may also be conditional on the value of another UI object property. For example, if a UI object is selected, the color value of the UI object and an adjacent object may be specified as gray, otherwise the color value of both objects may be specified as black. In these above-examples, the UI object properties can be represented in terms of a logical expression that allows the software application, or a computing device operating system, to determine the value of the property at any time by evaluating the expression. These types of property systems are commonly referred to as "dependency-based systems."

In some conventional dependency-based systems, the operating system individually evaluates each property expression to determine property values. However, depending on the order utilized to evaluate, the modification of a single object property value, such as source object property, may subsequently affect any number of other property values, including the current object property value. Accordingly, the evaluation of single property value expression may require several operating system iterations, often in terms of screen regenerations, to obtain the final steady values of the object properties dependent on the source modification. However, continuous regeneration of the display by the operating system degrades the computing device's performance and diminishes the ability for the computing device to process additional system functions. Moreover, although some programmatic user interface configurations can predetermine system dependencies, such systems are not compatible with a dynamic user interface created by declarative languages.

Thus, there is a need for a system and method for efficiently processing property dependent-property changes in a dynamic user interface.

SUMMARY OF THE INVENTION

A method and system for declarative user interface dependency-based object property system are provided. A source object property change is obtained. Steady-state values for all dependent properties are obtained. Any dependent properties whose value is not affected by the source property change are eliminated or which are duplicate properties are eliminated. The remaining steady-state post modification dependent object property changes are implemented.

In accordance with an aspect of the present invention, a method for processing object property changes in a computer system having at least one application program operable to instantiate objects having at least one property is provided. An operating system obtains a property change for a source object property change. The source property change value is not dependent on any other object properties. The operating system then obtains a pre-source change steady-state value for at least one object property dependent on the source object property. The dependent object property value is determined by an evaluation of a relational expression. The operating system obtains a post-source change steady-state value for at least one object property dependent on the source object property. The operating system processes any non-affected dependent object properties and any duplicative dependent object properties. Additionally, the operating system implements any remaining dependent object properties.

In accordance with another aspect of the present invention, a method for processing user interface object property changes in a computer system having a software application operable to generate one or more user interfaces having a number of user interface objects and at least one software application operable to instantiate user interface objects having at least one property. An operating system obtains a property change for a source user interface object property change. The source property change value is not dependent on any other user interface object properties. The operating system then obtains a pre-source change steady-state value for at least one user interface object property dependent on the source object property. The dependent user interface object property value is determined by an evaluation of a relational expression. The operating system generates a memory array containing array elements corresponding to the source user interface object property and at least one dependent user interface object property and populates the array elements of the memory array with the pre-source change steady-state values for all user interface object properties represented in the memory array. The operating system then obtains a post-source change steady-state value for at least one user interface object property dependent on the source user interface object property and populates the array elements of the memory array with the post-source change steady-state values for all user interface object properties represented in the memory array. The operating system coalesces the array elements of memory array and implements any remaining dependent user interface object properties.

In accordance with a further aspect of the present invention, a method for processing object property changes in a computer system having at least one software application operable to instantiate objects having at least one property is provided. An operating system obtains a property change for a source object property change. The source property change value is not dependent on any other object properties. The operating system obtains obtaining a pre-source change steady-state value for at least one object property dependent on the source object property. The dependent user interface object property value is determined by an evaluation of a relational expression. The operating system generates a memory array containing array elements corresponding to the source object property and at least one dependent object property. For each array element in the array, the operating system generates additional array elements for each object property that depends from an array element. Each object property is linked to its dependent properties and wherein an object property may be represented by more than one array element.

The operating system then populates the array elements of the memory array with the pre-source change steady-state values for all object properties represented in the memory array. The operating system obtains a post-source change steady-state value for at least one object property dependent on the source object property and populates the array elements of the memory array with the post-source change steady-state values for all object properties represented in the memory array. The operating system then performs a breadth-first array iteration to eliminate any non-affected array elements and a depth-first array iteration to eliminate any duplicative array elements. Additionally, the operating system implements any remaining dependent user interface object properties.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 24 is a block diagram of a computer system suitable for implementing the present invention.

DETAILED DESCRIPTION OF THE PREFERRED EMBODIMENT

Figures 1, 2:
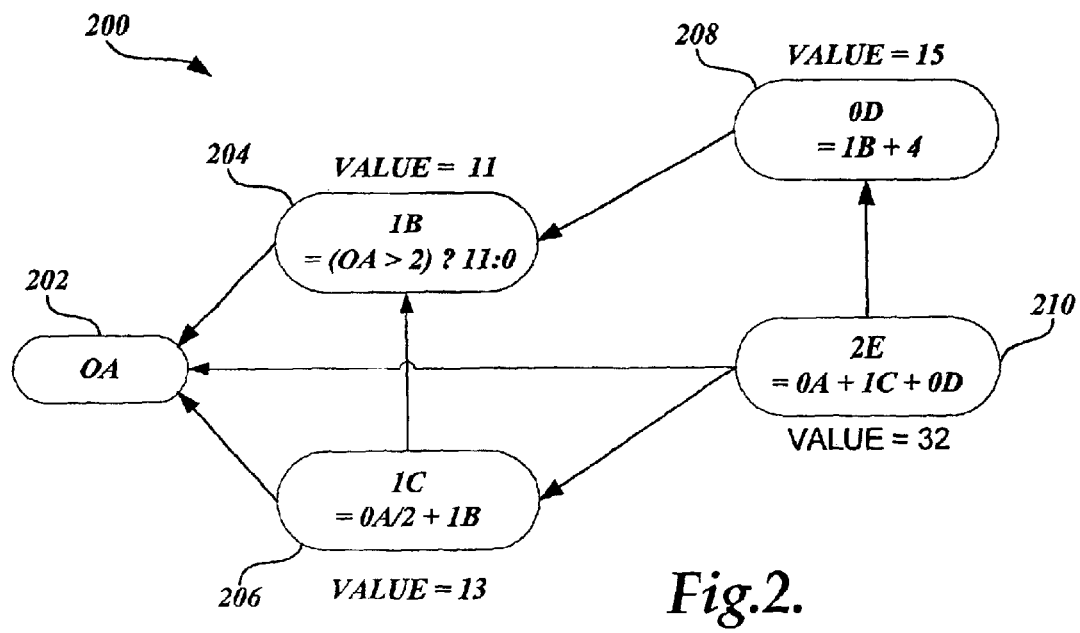
FIG. 1 is a block diagram of data utilized to instigate a property change in accordance with the present invention.
FIG. 2 is block diagram illustrative of a dependency graph for a group of property objects formed in accordance with the present invention.

FIG. 24 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purposes such as well known computing systems, environments, and/or configurations. Example of such that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 24, an exemplary system for implementing the invention includes a general purpose-computing device in the form of a computer 20. Components of a computer 20 include, but are not limited to, a processing unit 22, a system memory 24, and a system bus 26 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 24 illustrates an operating system 46, application programs 48, other program modules 50, and program data 52.

The computer 20 may also include removable/non-removable, volatile/non-volatile computer storage media. By way of example only, FIG. 24 illustrates a hard disk drive 34 that reads from or writes to non-removable, non-volatile magnetic media 36, a magnetic drive 38 that reads from or writes to a removable, non-volatile magnetic disk 40, and an optical disk drive 42 that reads from or writes to a removable, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 57, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associated computer storage media discussed above and illustrated in FIG. 24, provide storage of computer-readable instructions, data structures, program modules and other data for the computer 20. In FIG. 24, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 24. The logical connections depicted in FIG. 24 include a local area network (LAN) 66 and a wide area network (WAN) 67, but also include other networks. Such network environments are commonplace in office, enterprise-wide computer networks, Intranets, and the Internet. One skilled in the relevant art will appreciate that the computer 20 may be configured such that at least one network connection is non-continuous. Accordingly, the computer 20 would be unable to communicate with the remote computer 65 throughout a period of time that the network connection is disabled. Such a configuration is described generally as an "off-line" configuration.

When used in a LAN network environment, the computer 20 is connected to the LAN 66 through a network interface adapter 68. When used in a WAN network environment, the computer typically includes a modem or other means for establishing communications over the WAN 67, such as the Internet. The modem, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 24 illustrates remote application programs 48 as residing on memory device 24. It will be appreciated that the network connections shown are exemplary and other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to load the operating system from the hard disk drive 34 into the RAM 30. Once the operating system 46 is loaded into RAM 30, the processing unit executes the operating system code and causes the visual elements associated with the user interface of the operating system to be displayed on a monitor. When a user opens an application program 48, the program code and relevant data are read from the hard disk drive and stored in RAM 38.

As is appreciated by those skilled in the art, the World Wide Web (WWW) is a vast collection of interconnected or "hypertext" documents written in HyperText Markup Language (HTML) or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks that may be identified in various ways (e.g., highlighted portions of text) which link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is known to those skilled in the art, a WWW server may also includes facilities for storing and transmitting application programs, which is application programs written in the JAVA™ programming language from Sun Microsystems, for execution on a remote computer. Likewise a WWW server may also include facilities for executing scripts or other application programs on the WWW server itself.

A consumer or other remote user may retrieve hypertext documents from the WWW via a WWW browser application program. The WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present application is directed toward a method and system for implementing a dependency-based property system for mitigating the amount of time necessary to process property changes in a user interface UI. More specifically, the present invention will be described in relation to a system and method for implementing a dependency-based property system for a declarative UI. However, one skilled in the relevant art will readily understand that the present invention is not limited in its application to a declarative UI. Thus, it is to be understood that the disclosed embodiment is only by way of example and should not be construed as limiting.

In accordance with the present invention, a software application program 48 can instantiate various UI display objects by specifying various attribute values for the UI display objects and transmitting the definition of the UI object to the operating system 46. Additionally, other components, including components of the operating system 46 may define UI objects to be displayed. In turn, the operating system 46 can manipulate a number of hardware devices to generate the UI objects on the computer display. In one embodiment of the present invention, software applications 48 resident on the system memory 24 can instantiate UI objects for display through the use of a markup language conforming to the standard generalized markup language ("SGML") format, such as the extensible markup language ("XML"). In accordance with this embodiment, each software application program 48 may generate XML instance data specifying displaying properties conforming to a cascading style sheet ("CSS") or Level 2 cascading style sheet ("CSS2"). One skilled in the relevant art will appreciate that the XML instance data generated by the software application program may utilize a base XML schema defined by the operating system or an extended XML schema in specifying the attribute values. Still further, one skilled in the relevant art will appreciate that the software application 48 is not limited to utilizing XML instance data or variations of a cascading style sheet.

FIG. 1 is a block diagram illustrative of XML instance data 100 specifying attribute values for a UI object in accordance with the present invention. In accordance with this illustrative embodiment, the XML instance data 100 relates to defining display attribute values for a specific UI object, namely, a "BUTTON" object generated for the software application program 48. The XML instance data 100 includes a first portion 102 for specifying a "raised" attribute value for the "borderstyle" attribute of the "Button" class. Additionally, the XML instance data 100 includes a second portion 104 for specifying a "sunken" attribute value for the "borderstyle" attribute if an attribute "selector" is at a "pressed" value. The XML instance data 100 specifies values for the "borderstyle" attribute that are conditional upon whether the selector attribute has a "pressed" attribute value. Thus, the operating system 46 would be instructed to display the borderstyle of the BUTTON object as "raised" if the selector has a pressed value, and "sunken" if the selector has a not pressed value.

One skilled in the relevant art will appreciate that an software application program 48 may pass XML instance data, either as a single transmission or multiple transmissions, specifying conditional attribute properties for any number of UI object properties. In an illustrative embodiment of the present invention, some, or all, of a UI object's property attributes may be dependent on a source UI object value such that the modification of the source modification may also be associated with a series of property changes. Accordingly, in accordance with present invention, the operating system 46 generates dependency expressions for the source object properties and determines all dependent object property pre-processing steady state values. After processing the effect of the modification of the source object change, the operating system 46 eliminates any duplicate or unchanged property values and determines a final steady state value for the remaining dependent object property. Accordingly, the operating system 46 can implement the finalized property changes while mitigating the implementation of unchanged, duplicative and/or temporary property values.

FIG. 2 is a block diagram of an illustrative dependency graph 200 for three user interface ("UI") objects having various properties in accordance with the present invention. In an illustrative example, the three UI objects are represented by numerals, namely, "0", "1", and "2". Each object can also be associated with one or more properties, represented in the illustrative example as letters, whose value may be fixed or made dependent on one or more of the other object properties. With reference to FIG. 2, object "0" includes a property "A" (hereinafter "0A") 202 whose value is not dependent on any additional properties. Object "1" includes a property "B" (hereinafter "1B")204 whose value is dependent on 0A 202 and defined by equation (1):

if 0A>2, then 1B=11; if 0A<=2, then 1B=0. (1)

Object "1" also includes a property "C" (hereinafter "1C") 206 whose property is dependent on both 0A 202 and 1B 204 and defined by equation (2):

$$1C=0A/2+1B. \quad (2)$$

Similarly, object "0" also includes a property "D" (hereinafter "0D") 208 whose property is dependent on 1B 204 and defined by equation (3):

$$0D=1B+4. \quad (3)$$

Finally, object "2" includes a property "E" (hereinafter "2E") 210 whose property is dependent on 0A 202, 1C 206 and 0D 208 and defined by equation (4):

$$2E=0A+1C+0D. \quad (4)$$

One skilled in the relevant art will appreciate that an object may be associated with any number of properties and a software application user interface can instantiate any number of UI objects.

FIG. 2 also illustrates the interdependencies between the object properties. 1B 204, 2E 210 and 1C 206 all depend on 0A 202. 0D 208 and 1C 206 depend on 1B 204. 2E 210 also depends on 0D 208 and 1C 206. In the illustrative embodiment, because all the properties depend either directly or indirectly on 0A 202, 0A is commonly referred to as the root source. Additionally, although only one root source is illustrated in FIG. 2, one skilled in the relevant art will appreciate a UI may have more than one root source and that an object property may be dependent on two or more root source properties.

Figure 3:
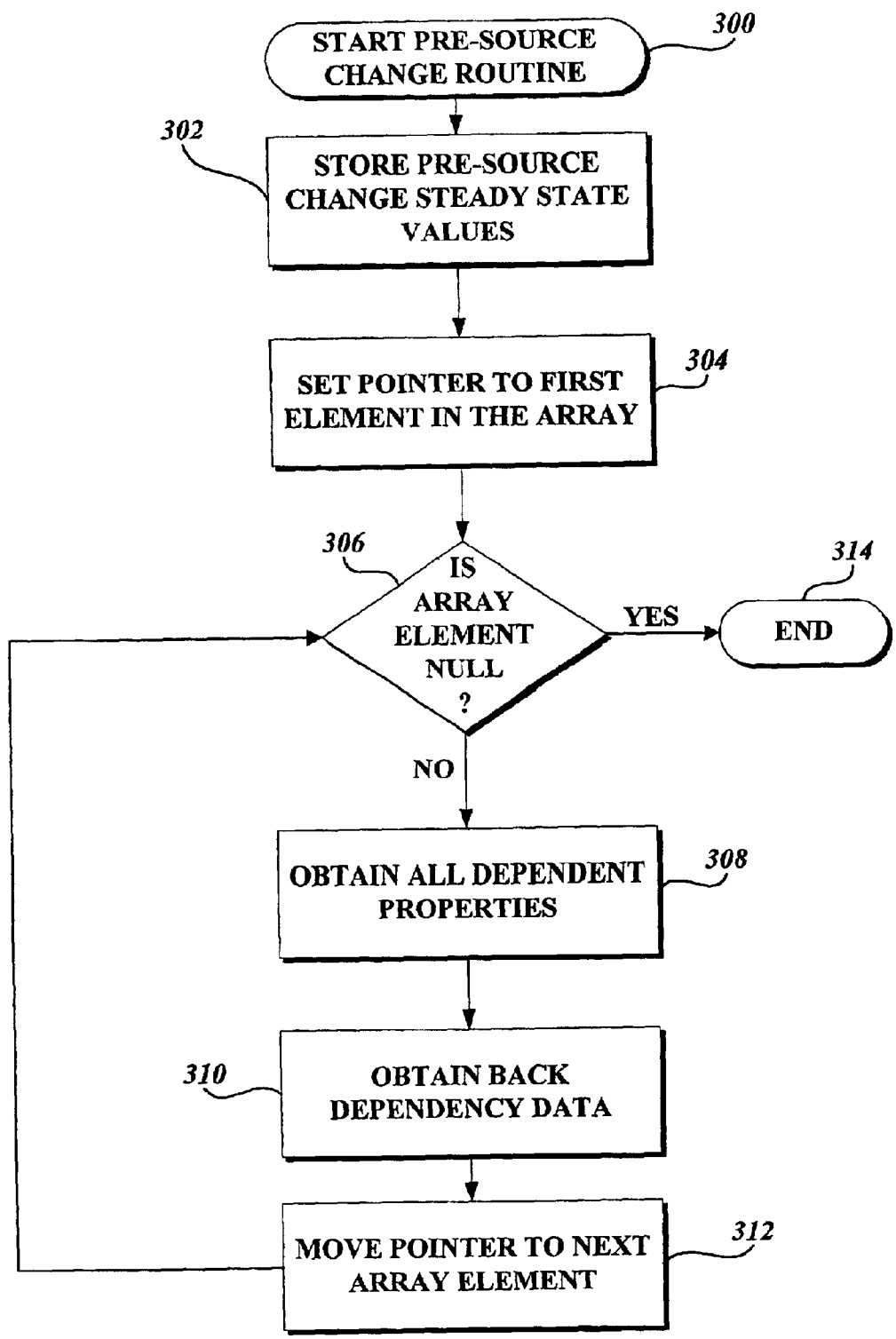
FIG. 3 is a flow diagram illustrative of a pre-source change optimization routine in accordance with the present invention.

The present invention is directed to a method and system for processing the change in property values in an efficient manner by optimizing the property change calculation and coalescing redundant operations. In an illustrative embodiment, assume the value of 0A 202 equals "4" and that it will be changed to "6". FIG. 3 is a flow diagram illustrative of a pre-source change optimization routine 300 for in accordance with the present invention. At block 302, the pre-source change steady state values for all the object properties are calculated and stored in an array.

Figure 4:
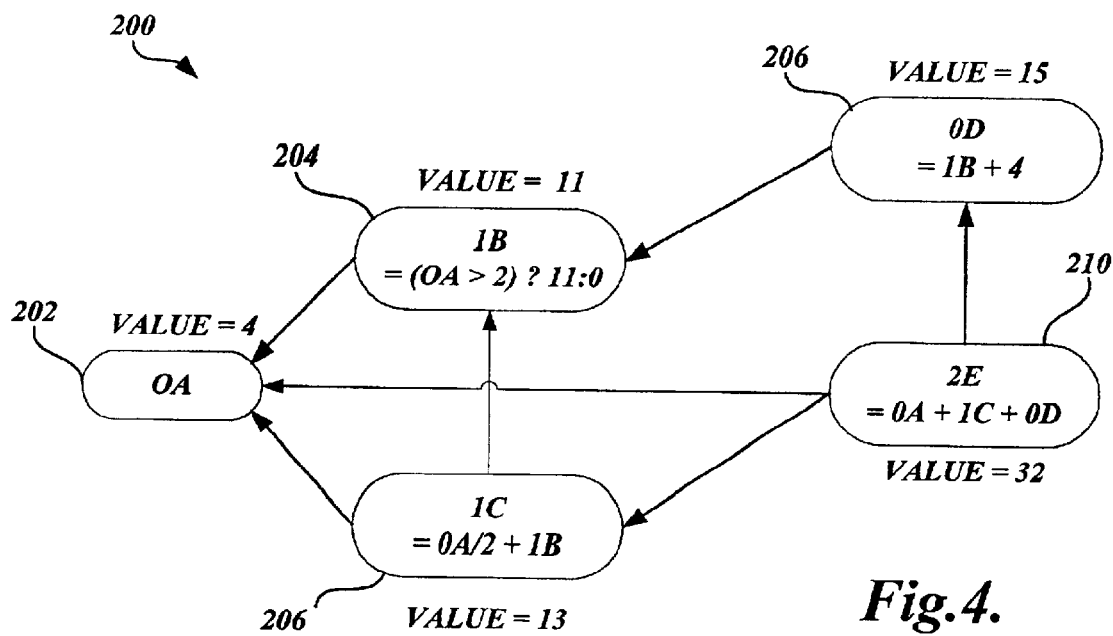
FIG. 4 is a block diagram of the dependency graph of FIG. 2 illustrating an evaluation of a steady state value prior to a source change.

FIG. 4 is the dependency graph 200 of FIG. 2 illustrative of the steady-state property values for the object properties prior to the modification of the root source, A0 202. In an illustrative example, the steady-state values are evaluated with a root source value of "4." By evaluating each expression, the relative values of each object are as follows: 1B=11, 1C=13, 0D=15 and 2E=32. In an actual embodiment of the present invention, the values of each object property are not stored in memory. Rather, the source value, which is not dependent on any other object property, is stored in memory, such as program data 52. Accordingly, the operating system 46 calculates each dependent object's value on an as needed basis by evaluating the UI object's dependency expression at the time the value is needed. Thus, no additional memory is utilized to store the value. Alternatively, if one or more property object values are needed on a frequent basis, these values may be cached in memory, such as RAM 30, for faster access and less demand on the processing resources.

Figure 5:
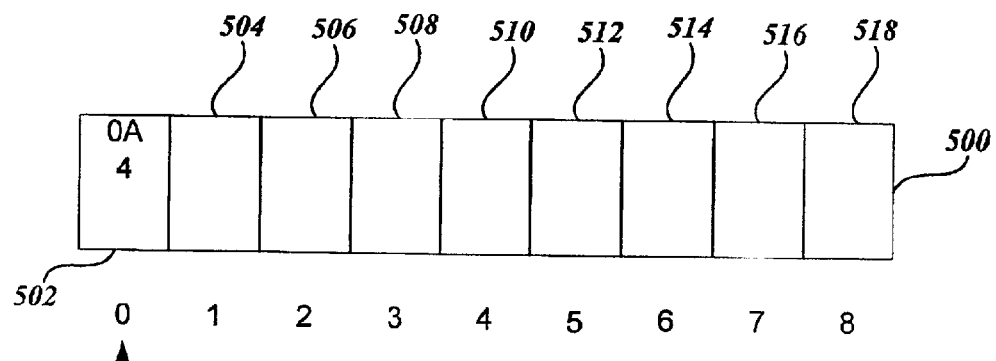
FIG. 5 is a block diagram illustrative of pre-source change object property value array in accordance with the present invention.

FIG. 5 is a block diagram illustrative of an object property value memory array 500 operable to store object property values in accordance with the present invention. As illustrated in FIG. 5, the first element 502 in the array 500 represents the source object property, 0A 202, and indicates that the value of the property is changing from "4" to "6". Returning to FIG. 3, at block 304, a pointer is set to the first element in the array 500. At decision block 306, a test is conducted to determine whether the element corresponding to the pointer in the array contains a null value. If the element contains a null value, the routine terminates at block 314.

Figure 6:
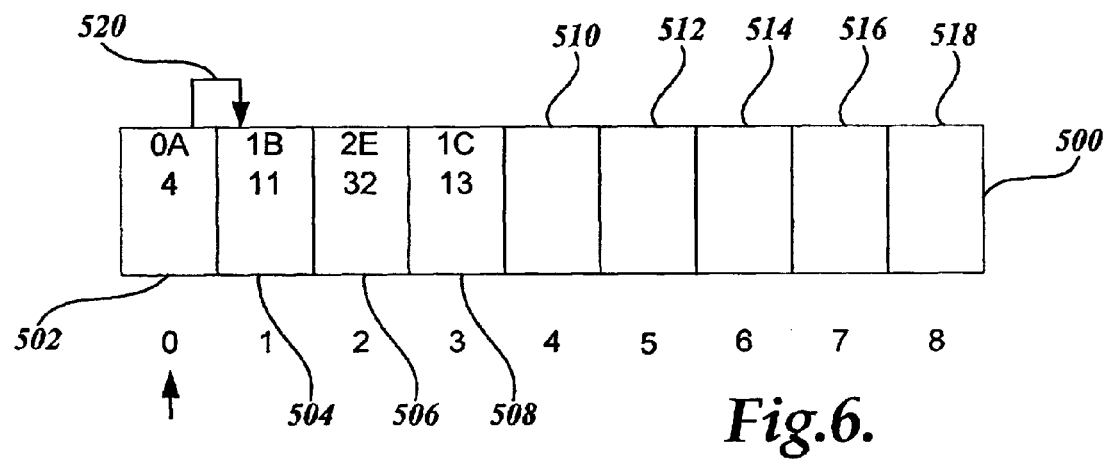
FIG. 6 is a block diagram of the array of FIG. 5 illustrating the population of the array in accordance with the present invention.

If the element does not contain a null value, at block 308, all the dependent property objects are obtained and each dependent object property is represented as an element in the array 500. FIG. 6 is a block diagram of the array 500 of FIG. 5 illustrating the creation and population of additional array elements 504, 506, and 508 in accordance with the present invention. In the illustrative embodiment, because 1B 204, 2E 210 and 1C 206 are directly dependent on 0A, three array elements are created and populated with the steady-state value calculated, or otherwise obtained at block 302. Additionally, a pointer 520 is drawn from array element 502 to array element 504 to represent the beginning of the dependency.

At block 310, a back dependency record for the current array element and its dependent array elements is updated. In an actual embodiment of the present application, each array element can include back dependency data indicating the last array element from the same object. As will be explained in greater detail below, the back dependency data will be utilized by the operating system 36 for coalescing and mitigating duplicative or intermediate object property values.

Figure 7:
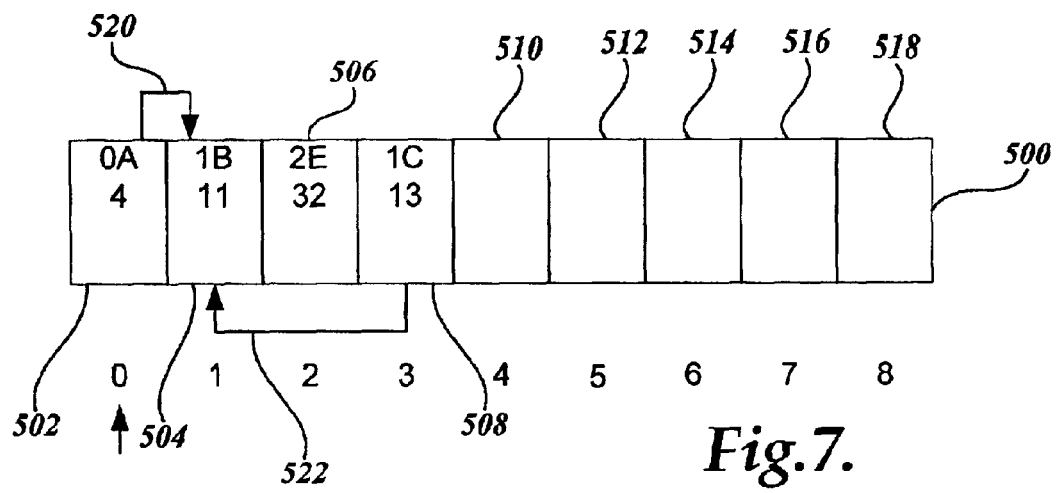
FIG. 7 is a block diagram of the array of FIG. 5 illustrating the population of the back dependency of the array elements in accordance with the present invention.

FIG. 7 is a block diagram of the array 500 of FIG. 5 illustrating the inclusion of a back dependency data in the array elements in accordance with the present invention. With regard to the first element 502 in the array 500, because this is the first instance of a property for object "0" and array element 502 is populated with an indication that array position "0" is the previous array element having a property value for object "0." Moving to array element 502, because the array element is the first instance of a property for object "1" array element 504 is populated with an indication that array position 1 is the previous array element having a property value for object "1." Similarly, array element 506 is populated with an indication that position "2" is the previous array element having a property value for object "2." However, at array element 508, a second instance of a property value for object "1" is specified. Accordingly, array element 508 is populated with an indication that array element 506, at position "1" is previous array element specifying a value for object "1". The back dependency data is exemplified in FIG. 7 by back pointer 522 in FIG. 7.

Returning to FIG. 3, at block 312, the array pointer is moved to the next element in the array and the array element becomes the next current array element. In the illustrative embodiment, the array pointer is moved to location "1" to designate the second array element 504 as the current array element. The routine 300 repeats to decision block 306 to determine whether the current array element of the array 500 contains a null value. Once the array pointer moves to an array element containing a null value, routine 300 terminates at block 314. Although routine 300 illustrates a breadth-first array iteration, one skilled in the relevant art will appreciate that alternative approaches may also be utilized in accordance with the present invention.

Figure 8:
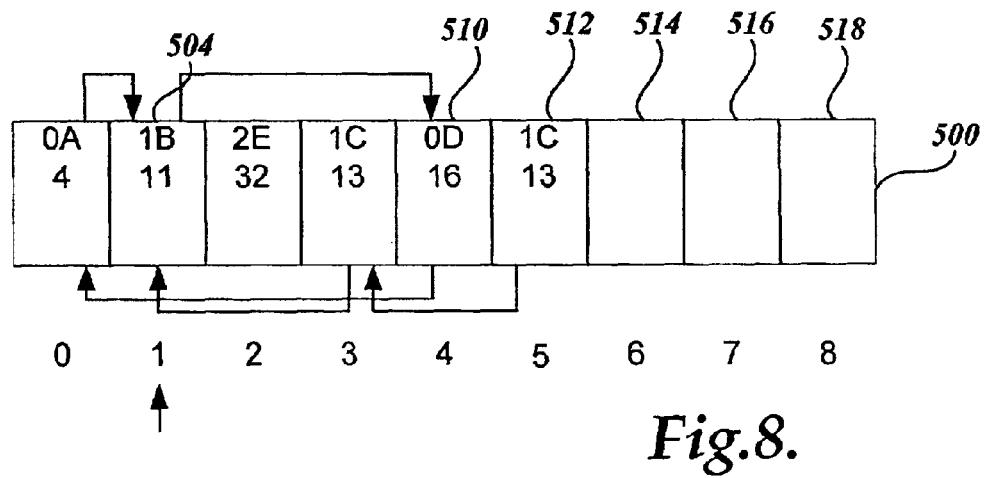
FIG. 8 is a block diagram of the array of FIG. 5 illustrating the execution of the pre-source changing routine of FIG. 3 in accordance with the present invention.
Figure 9:
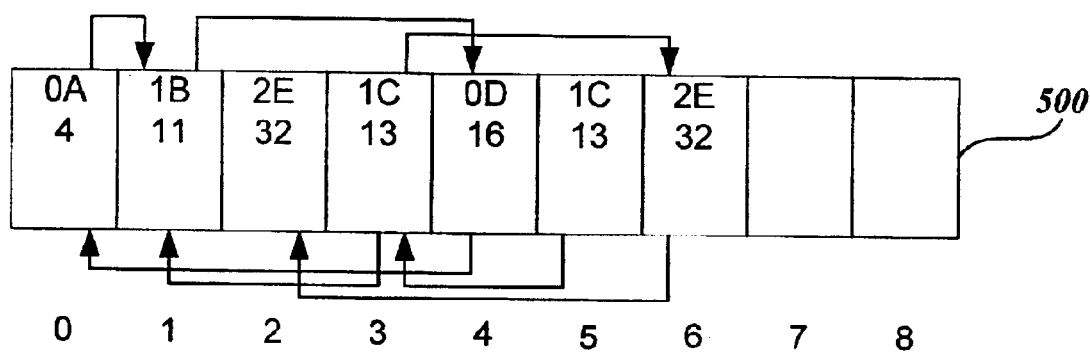
FIG. 9 is a block diagram of the array of FIG. 5 illustrating the execution of the pre-source changing routine of FIG. 3 in accordance with the present invention.
Figure 10:
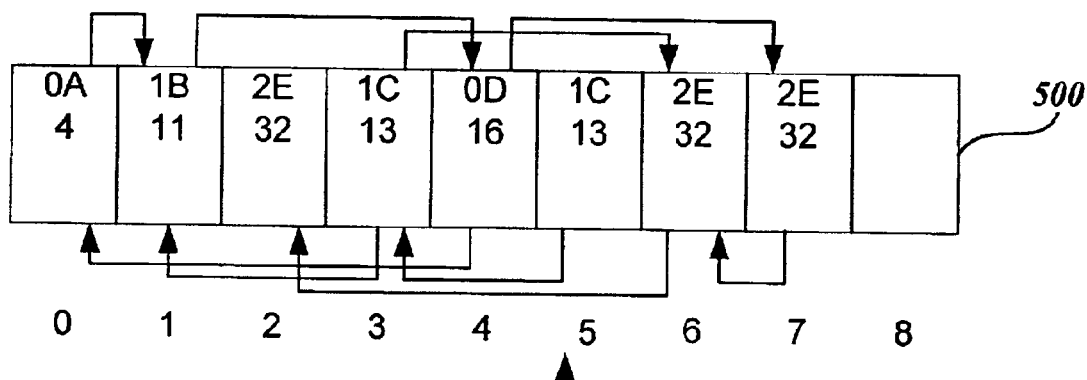
FIG. 10 is a block diagram of the array of FIG. 5 illustrating the execution of the pre-source changing routine of FIG. 3 in accordance with the present invention.
Figure 11:
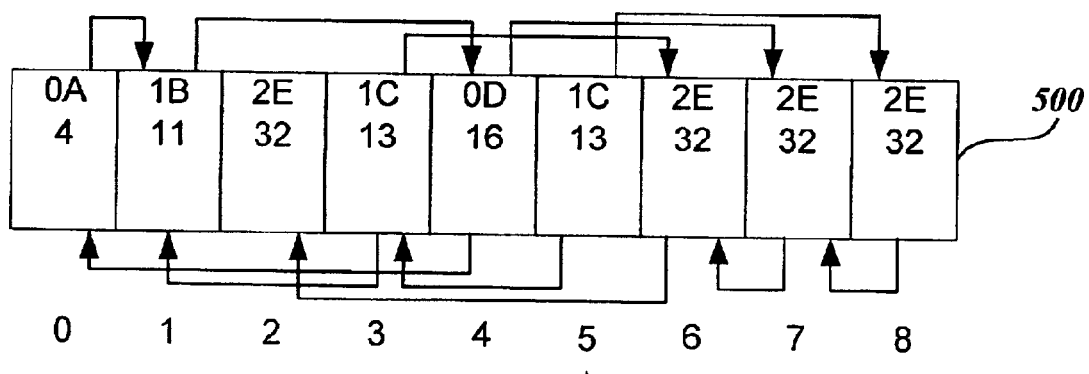
FIG. 11 is a block diagram of the array of FIG. 5 illustrating the execution of the pre-source changing routine of FIG. 3 in accordance with the present invention.

FIG. 8 is a block diagram of the array 500 of FIG. 5 illustrating the implementation of blocks 306–310 (FIG. 3) for the second array element 504 as the current array element. Likewise, FIGS. 9–11 are block diagrams of the array 500 of FIG. 5 illustrating additional iterations of blocks 306–310 (FIG. 3) for successive iterations of the array elements of array 500. One skilled in the relevant art will appreciate that because object property 2E 210 does not have any dependencies, the iteration of the blocks 306–310 array elements specifying values for 2E 210 will not create any additional array elements. Moreover, because some object properties, such as 2E 210, depend from multiple object properties, the array 500 can include more than one array element containing values for the specific object property.

Figure 13:
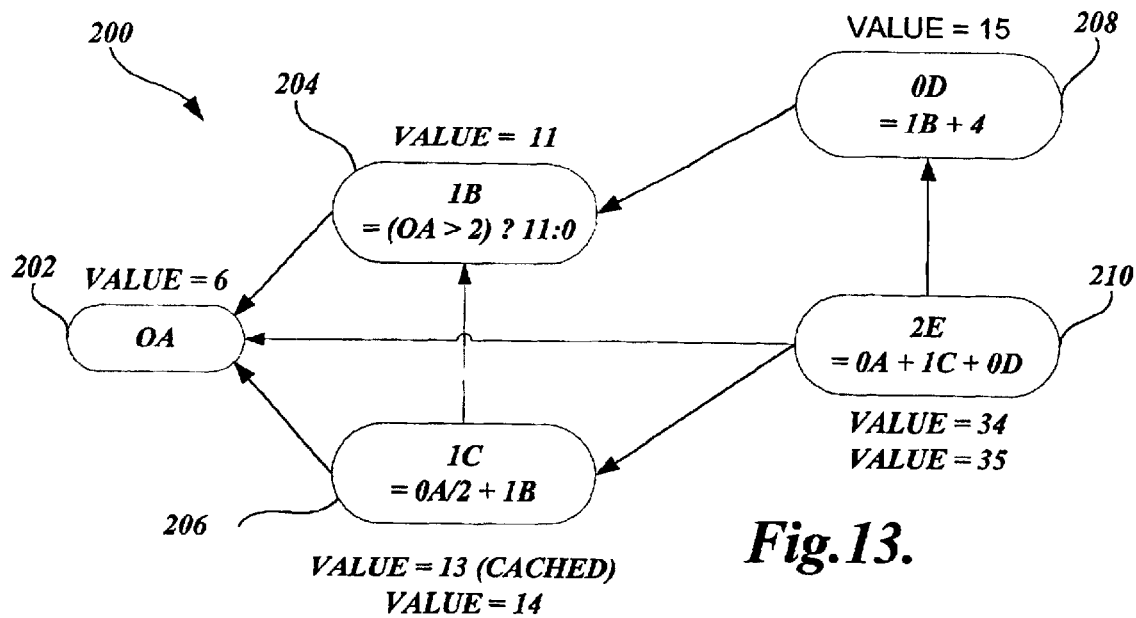
FIG. 13 is a block diagram of the dependency graph of FIG. 2 illustrative of the post-source change values for the object property groups.

In accordance with the present invention, once the pre-source change steady state values have been calculated, the operating system calculates object property values after the post-source change. For the purposes of an illustrative embodiment, FIG. 13 is a block diagram of the dependency graph 200 of FIG. 2 illustrative of the steady-state property values for the object properties after the modification of the root source, A0 202. Additionally, FIG. 13 also illustrates an alternative embodiment in which one or more object property values are cached. More specifically, object property 1C 206 includes a cached object property value.

Figure 12:
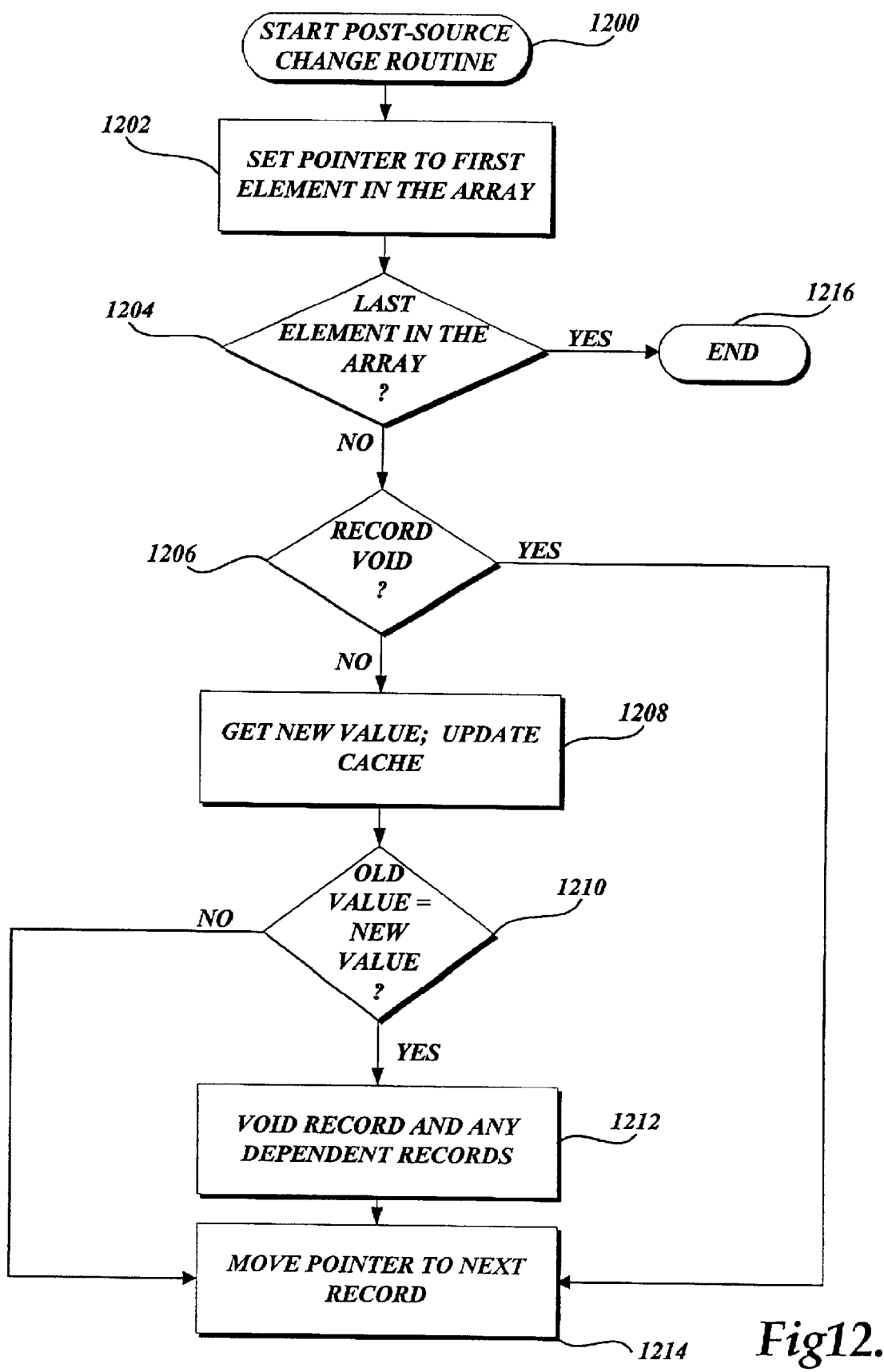
FIG. 12 is a flow diagram illustrative of a post-source change processing routine in accordance with the present invention.
Figure 14:
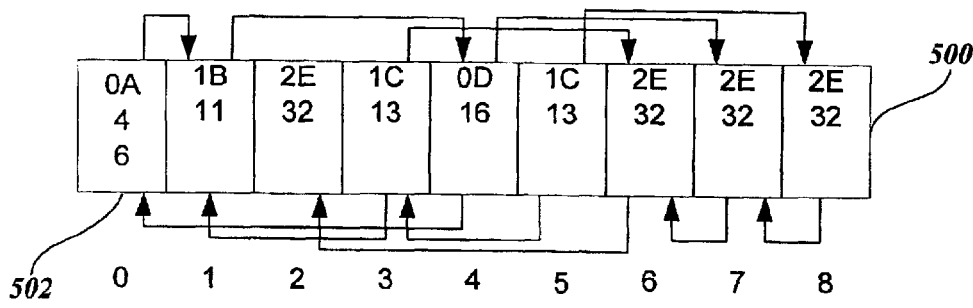
FIG. 14 is a block diagram of the array of FIG. 5 illustrating the execution of the post-source changing routine of FIG. 12 in accordance with the present invention.

FIG. 12 is a flow diagram illustrative of a post-source change processing routine 1200 in accordance with the present invention. At block 1202, the pre-source change array 500 is obtained and a pointer is set to the first element 502 of the array. FIG. 14 is a block diagram of the array 500 of FIG. 11 with an array pointer at the first array element. At decision block 1204, a test is conducted to determine whether the array element is the last element in the array 500. If the array element is the last element, the routine 1200 terminates at block 1216. If the array element is not the last element, at decision block 1206, a test is conducted to determine whether the array element is void. As will be explained below with respect to blocks 1212, an array element is voided if its steady value before the root source does not change after the modification of the root source.

If the array element is void, the routine 1200 proceeds to block 1212, which will be explained below. If the array element is not voided, at block 1208, the new value for the object property is obtained. As explained above, aside from the source object property, the value for every object property is not stored in memory, but calculated at the time it is needed. Alternatively, as illustrated in object properties 0A 202 and 1C 206, some more commonly used object properties may be selectively cached. In such object properties, the cache is also updated at block 1208. With reference to FIG. 14, array element 502, corresponding to 0A 202, is updated to reflect a value change from "4" to "6."

At decision block 1212, a test is done to determine whether the previous value of the array element is the same as the new calculated value. If the values are the same, at block 1214, the array element is voided. In an actual embodiment, the voiding of the array element indicates that the property objects value did not change. Additionally, each array element dependent on the current array is also voided at block 1214. In an actual embodiment of the present invention, the dependent array elements are also voided because the array element will not change as a result of the voided array element. If the values are not the same at decision block 1212 or after voiding the array elements at block 1214, the pointer is moved to the next element in the array. The routine 1200 returns to decision block 1204. Once the array pointer reaches the last element of the array 500, the routine terminates at block 1216. Although routine 1200 illustrates a depth first array iteration, one skilled in the art will appreciate that alternative approaches may be utilized in accordance with the present invention.

Figure 15:
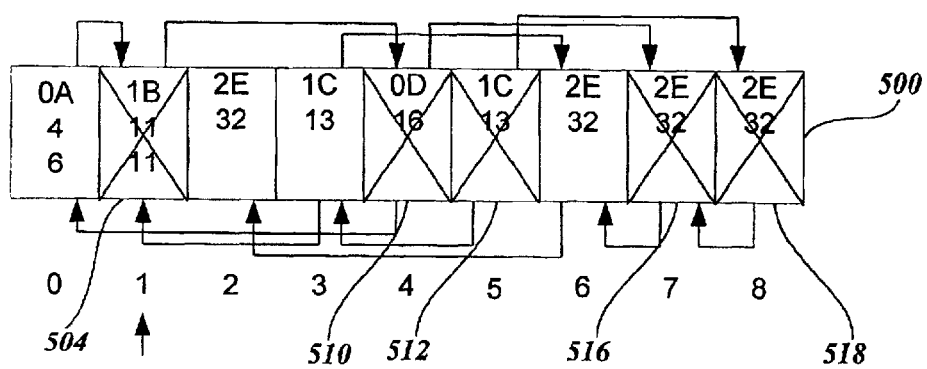
FIG. 15 is a block diagram of the array of FIG. 5 illustrating the execution of the post-source change routine of FIG. 12 in accordance with the present invention.

FIG. 15 is a block diagram of the array 500 of FIG. 5 illustrating an iteration of the post-source change routine 1200 of FIG. 12 for the second array element 504 As illustrated in FIG. 15, element array 504 corresponds to object property 1B 204. However, as illustrated in FIG. 13, the value of the 1B 204 did not change with the change in value of 0A 202. Accordingly, in accordance with block 1212 of routine 1200, the array element 504 is voided and will be ignored for future processing. Additionally, array elements 510 and 512 are also voided because they are dependent on array element 504. Moreover, array elements 516 and 518 are voided because they in turn are dependent on array elements 510 and 512 that are now voided.

Figure 16:
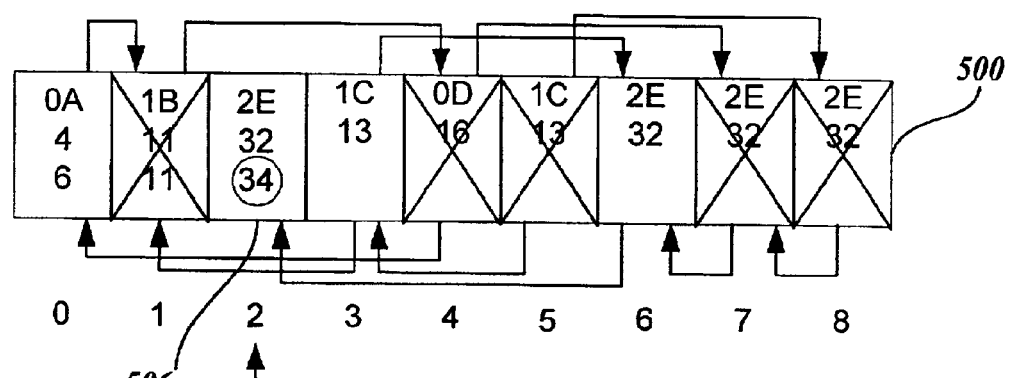
FIG. 16 is a block diagram of the array of FIG. 5 illustrating the execution of the post-source change routine of FIG. 12 in accordance with the present invention.

FIG. 16 is a block diagram of the array 500 of FIG. 5 illustrating an iteration of the post-source change routine 1200 of FIG. 12 for array element 506. In an illustrative embodiment, array element 506 corresponds to object property 2E 210, which is dependent on 0A 202, 1C 206, and 0D 208. Because the value of 0A 202 has changed, the value of 2E 210 will change as well. Additionally, because the value of 0D 208 is calculated at the time it is needed, the value for 0D 208 is recalculated, even though in this embodiment it remains "14". However, because it is assumed for this illustration that the value of 1C 206 is cached, the current cached value of 1C 206 remains at "13." Thus, the value of array element 506 contains an intermediate incorrect value for 2E 210.

Figure 17:
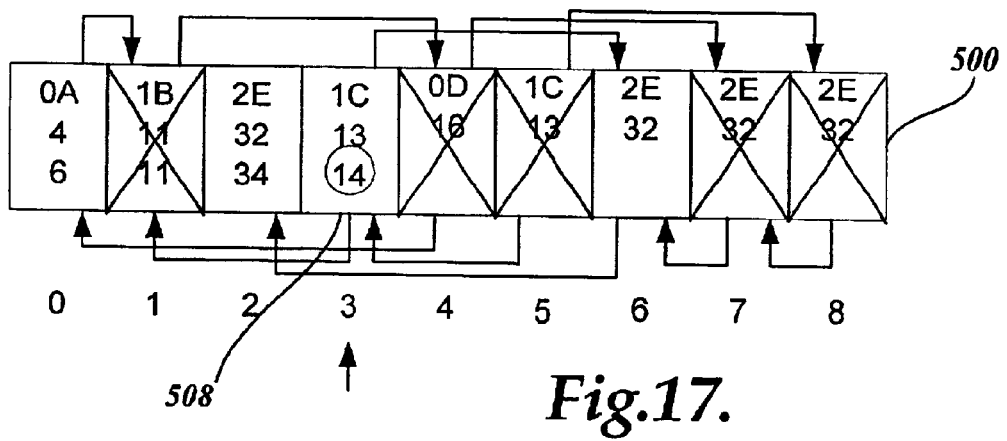
FIG. 17 is a block diagram of the array of FIG. 5 illustrating the execution of the post-source change routine of FIG. 12 in accordance with the present invention.
Figure 18:
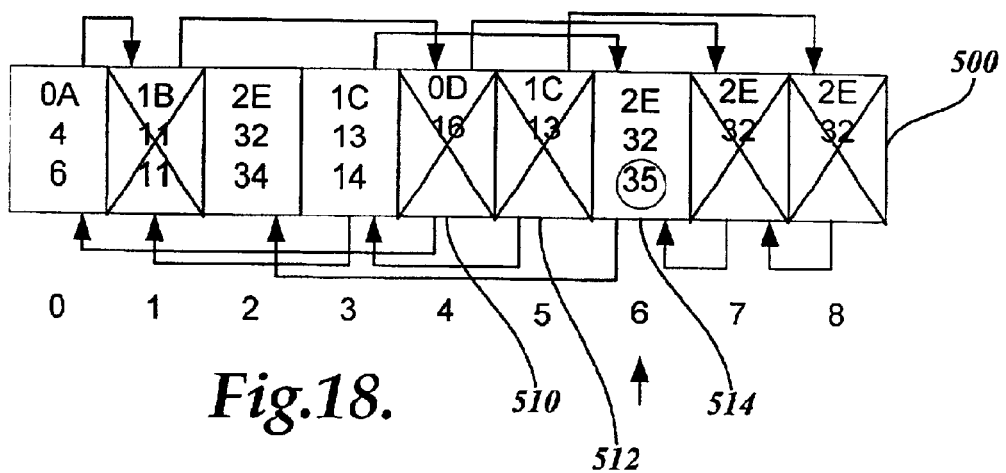
FIG. 18 is a block diagram of the array of FIG. 5 illustrating the execution of the post-source change routine of FIG. 12 in accordance with the present invention.
Figure 19:
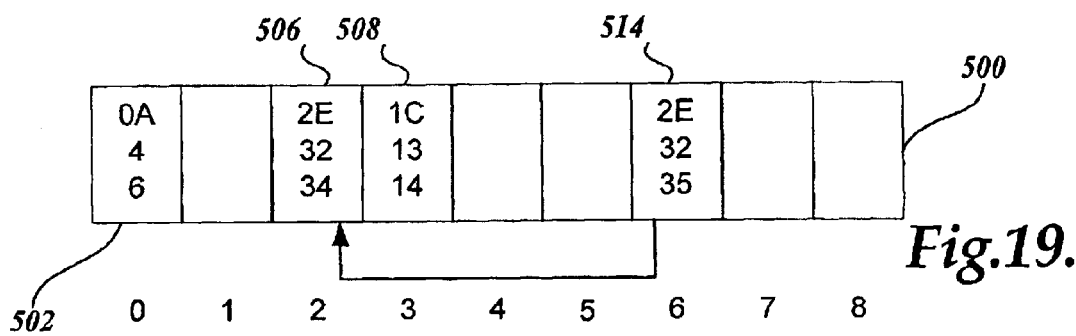
FIG. 19 is a block diagram of the array of FIG. 5 illustrating the execution of the post-source change routine of FIG. 12 in accordance with the present invention.

FIG. 17 is a block diagram of the array 500 of FIG. 5 illustrating an iteration of the post-source change routine of FIG. 12 for array element 508. With reference to FIG. 17, the value of 1C 206 is updated to "14" to reflect the change in value of 1A. Additionally, because the value of 1C 206 is cached, the cache value is also updated. FIG. 18 is a block diagram of the array 500 of FIG. 5 illustrating an iteration of the post-source change routine of FIG. 12 for array element 514. With reference to FIG. 18, the value of 2E 210 is updated to "35" to reflect the change in 0A 202, 0D 208, and the cached value of 1C 206. Note that because array elements 510 and 512 were previously voided, the iteration of routine 1200 for these array elements would not modify the array 500. FIG. 19 is a block diagram of the array 500 of FIG. 5 illustrating the contents of the array after the processing of the post-source change routine 1200 in accordance with the present invention. As illustrated in FIG. 19, after processing post-source change routine 1200, only array elements 502, 506, 508 and 514 contain non-voided data.

Figure 20:
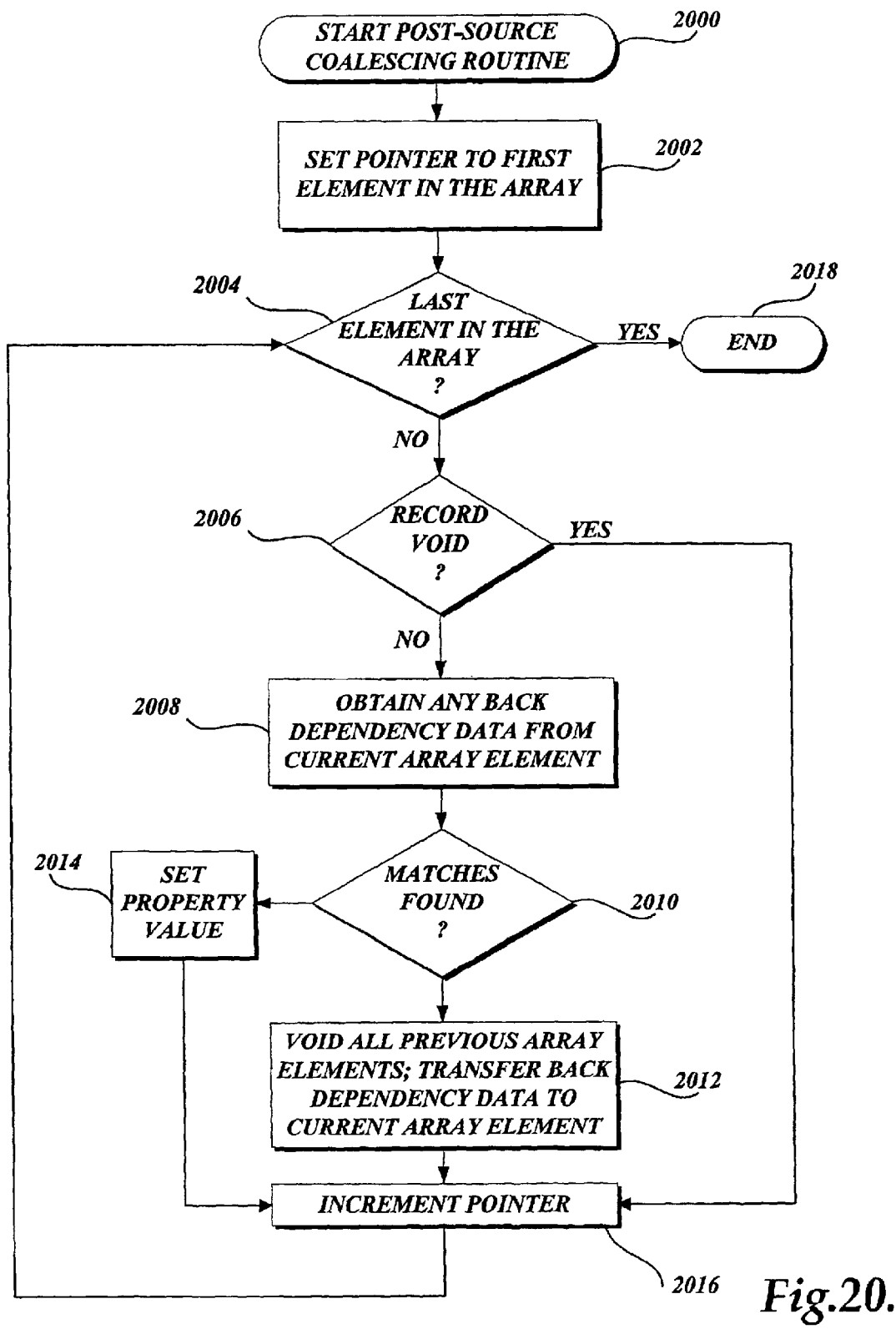
FIG. 20 is a flow diagram illustrative of a post-source change routine for coalescing object property values in accordance with the present invention.

In accordance with the present invention, once the pre-source change steady state values have been calculated, the operating system can also coalesce object property values prior to implementing the changed property value. FIG. 20 is a flow diagram illustrative of a post-source change routine 2000 for coalescing object property values in accordance with the present invention. At block 2002, a pointer is set to the first element of the array. At decision block 2004, a test is conducted to determine whether the pointer is at the end of the array 500. If the pointer has reached the end of the array 500, the process 2000 terminates at block 2018.

If the pointer has not reached the end of the array 500, at decision block 2006, a test is done to determine whether the current array element is void. If the element is void, the routine 2000 continues to block 2016 as will be explained in greater detail below. If the element is not void, at block 2008 back dependency information is obtained from the current array element. At decision block 2010, a test is done to determine whether the back dependency data points to array elements containing data matching the current array elements object property values. If there are matches found, the back dependency data from the previous record is transferred to the current array element at block 2012. Additionally, the previous array element referred to by the back pointer is voided. The routine 2000 continues to block 2016.

If no matches are found at decision block 2010, at block 2014, the object property value change notification property value has obtained its post modification value and can be implemented by the operating system 46. At block 2016, the pointer is moved to the next element in the array 500. The routine 2000 returns to block 2004, and routine 2000 will continue until all the remaining array elements of array 500 have been coalesced.

Figure 21:
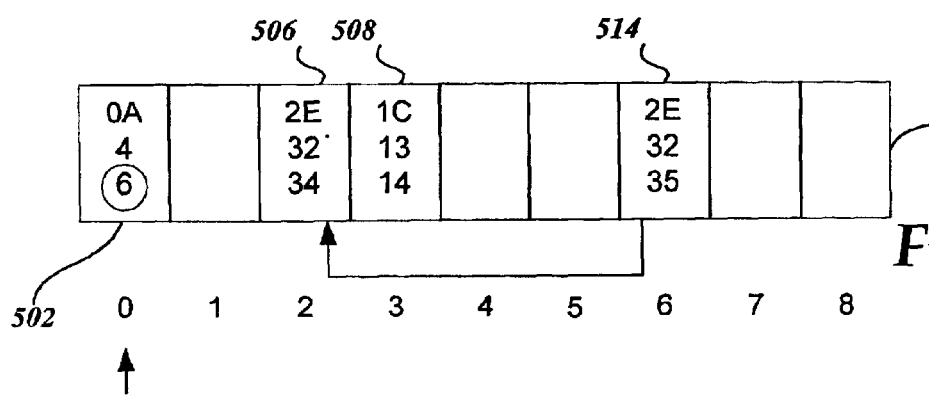
FIG. 21 is a block diagram of the array of FIG. 19 illustrating the execution of the post-source change routine in accordance with the present invention.
Figure 22:
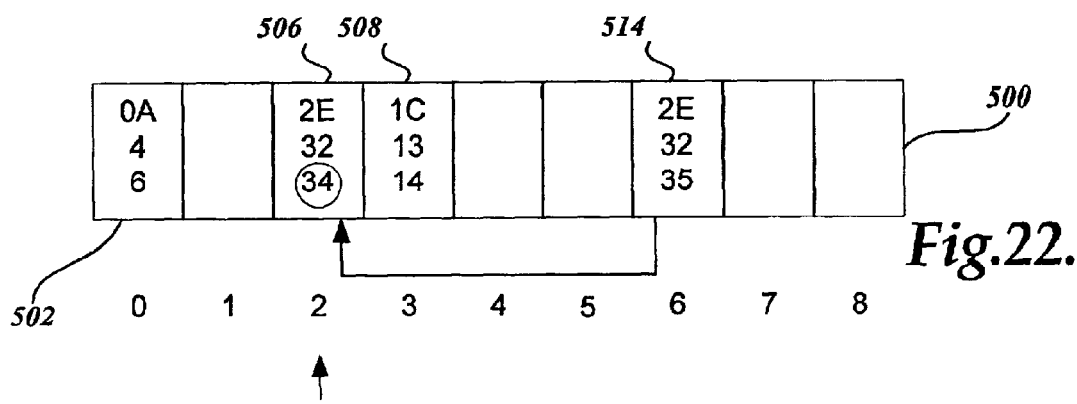
FIG. 22 is a block diagram of the array of FIG. 19 illustrating the execution of the post-source change routine in accordance with the present invention.
Figure 23:
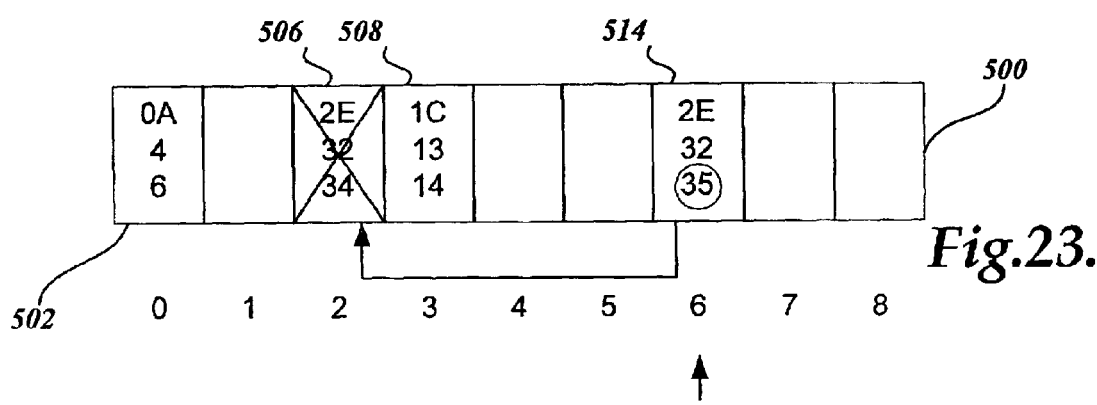
FIG. 23 is a block diagram of the array of FIG. 19 illustrating the execution of the post-source change routine in accordance with the present invention.

FIG. 21 is a block diagram of the memory array 500 of FIG. 19 illustrating a post-source change coalescing routine 2000 for array element 502. As illustrated in FIG. 19, because array element 502 does have any back dependency data, the property value has reached its post modification value and can be implemented. Similarly, FIG. 22 is a block diagram of the array 500 illustrating the post-source change coalescing routine 2000 for array element 506. As illustrated in FIG. 22, although array element 506 contains a value for 2E 210 that is not the correct end value, because array element 506 does not contain back dependency data, the value remains unchanged. Similarly, the value of array element 508 would also remain unchanged. However, as illustrated in FIG. 23, when array element 514 is processed according to the routine 2000, array element 506 is voided and array element 514 is modified to eliminate the back dependency data. At this point, because no other non-void array elements exist, the steady-state values for all post-modification changes is complete.

The present invention facilitates the processing of object property changes by mitigating the consideration of object properties that are not affected by a modification in a source object property. Additionally, the present invention facilitates the processing of object property changes by mitigating the multiple processing of the same object property change by the operating system 46.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. In a computer system having at least one software program operable to instantiate objects having at least one property, a method for processing object property changes, the method comprising:

obtaining a property change for a source object property change, wherein a source property change value is not dependent on any other object properties;

obtaining a pre-source change steady-state value for at least one object property dependent on the source object property, wherein a dependent object property value is determined by an evaluation of a relational expression;

obtaining a post-source change steady-state value for at least one object property dependent on the source object property;

processing any non-affected dependent object properties;

processing any duplicative dependent object properties; and implementing any remaining dependent object properties.

2. The method as recited in claim 1, wherein obtaining the source object property change includes obtaining from the application program a value change for the source object property.

3. The method as recited in claim 1, wherein obtaining the pre-source change steady-state value includes evaluating each dependent object property relational expression to obtain an object property value.

4. The method as recited in claim 1, wherein obtaining the pre-source change steady-state value includes obtaining at least one cached object property value, wherein cached object property value corresponds to a previously evaluated relational expression.

5. The method as recited in claim 1, wherein obtaining the post-source change steady-state value includes evaluating each dependent object property relational expression to obtain an object property value.

6. The method as recited in claim 1 further comprising, prior to processing any non-affected dependent object properties:
  generating a memory array containing array elements corresponding to the source object property and at least one dependent object property; and
  populating the array elements of the memory array with the pre-source change steady-state values for all object properties represented in the memory array.

7. The method as recited in claim 6, wherein generating the memory array includes, for each array element in the array, generating an array element for each object property that depends from an array element, wherein each object property is linked to its dependent properties and wherein an object property may be represented by more than one array element.

8. The method as recited in claim 6 further comprising correlating back-dependency data for each array element in the memory array, wherein the back dependency data corresponds to array elements related to the same object.

9. The method as recited in claim 6 further comprising populating the array elements of the memory array with the post-source change steady-state values for all object properties represented in the memory array.

10. The method as recited in claim 9, wherein processing any non-affected dependent object properties includes, for each array element, determining whether the object property pre-source change steady-state value is equal to the object property post-source change steady-state value.

11. The method as recited in claim 10, wherein processing any non-affected dependent object properties includes voiding any array element whose object property pre-source change steady-state value is equal to the object property post-source change steady-state value.

12. The method as recited in claim 11, wherein processing any non-affected dependent object properties includes voiding any array elements linked to a voided array element.

13. The method as recited in claim 12, wherein processing any duplicative dependent object properties includes, for every non-void array element:
  determining whether any array elements in the memory array correspond to the same object property; and
  if one or more array elements correspond to the same object property, determining the most recent array element corresponding to the object property; and
  voiding any additional array elements corresponding to the object property.

14. The method as recited in claim 13, wherein determining the most recent array element includes iteratively comparing two array elements and voiding the least recent of the two array elements.

15. The method as recited in claim 1, wherein implementing any remaining dependent object properties includes instantiating one or more objects with the post-source change object property values.

16. The method as recited in claim 1, wherein the objects include user interface objects.

17. A computer-readable medium having computer-executable instructions operable for performing the method as recited in claim 1.

18. A computer system having a processor and a memory, the computer system operable to perform the method as recited in claim 1.

19. In a computer system having a software program operable to generate one or more user interfaces having a number of user interface objects and at least one software application operable to instantiate user interface objects having at least one property, a method for processing user interface object property changes, the method comprising:
  obtaining a property change for a source user interface object property change, wherein a source property change value is not dependent on any other user interface object properties;
  obtaining a pre-source change steady-state value for at least one user interface object property dependent on the source object property, wherein a dependent user interface object property value is determined by an evaluation of a relational expression;
  generating a memory array containing array elements corresponding to the source user interface object property and at least one dependent user interface object property; and
  populating the array elements of the memory array with the pre-source change steady-state values for all user interface object properties represented in the memory array;
  obtaining a post-source change steady-state value for at least one user interface object property dependent on the source user interface object property;
  populating the array elements of the memory array with the post-source change steady-state values for all user interface object properties represented in the memory array;
  coalescing the array elements of memory array; and
  implementing any remaining dependent user interface object properties.

20. The method as recited in claim 19, wherein obtaining the source object property change includes obtaining from the application program a value change for the source object property.

21. The method as recited in claim 19, wherein obtaining the pre-source change steady-state value includes evaluating each dependent object property relational expression to obtain an object property value.

22. The method as recited in claim 19, wherein obtaining the pre-source change steady-state value includes obtaining at least one cached object property value, wherein cached object property value corresponds to a previously evaluated relational expression.

23. The method as recited in claim 19, wherein obtaining the post-source change steady-state value includes evaluating each dependent object property relational expression with a to obtain an object property value.

24. The method as recited in claim 19, wherein generating the memory array includes, for each array element in the array, generating an array element for each object property that depends from an array element, wherein each object property is linked to its dependent properties and wherein an object property may be represented by more than one array element.

25. The method as recited in claim 19 further comprising correlating back-dependency data for each array element in the memory array, wherein the back dependency data corresponds to array elements related to the same object.

26. The method as recited in claim 19, wherein coalescing the array elements of the memory array includes, for each array element, determining whether the object property pre-source change steady-state value is equal to the object property post-source change steady-state value.

27. The method as recited in claim 26, wherein coalescing the array elements of the memory array includes voiding any array element whose object property pre-source change steady-state value is equal to the object property post-source change steady-state value.

28. The method as recited in claim 27, wherein processing any non-affected dependent object properties includes voiding any array elements linked to a voided array element.

29. The method as recited in claim 19, wherein coalescing the array elements of the memory array includes, for every non-void array element:
   determining whether any array elements in the memory array correspond to the same user interface object property; and
   if one or more array elements correspond to the same user interface object property, determining the most recent array element corresponding to the user interface object property; and
   voiding any additional array elements corresponding to the user interface object property.

30. The method as recited in claim 29, wherein determining the most recent array element includes iteratively comparing two array elements and voiding the least recent of the two array elements.

31. The method as recited in claim 19, wherein implementing any remaining dependent user interface object properties includes instantiating one or more user interface objects with the post-source change user interface object property values.

32. A computer-readable medium having computer-executable instructions operable for performing the method as recited in claim 19.

33. A computer system having a processor and a memory, the computer system operable to perform the method as recited in claim 19.

34. In a computer system having at least one software application operable to instantiate objects having at least one property, a method for processing object property changes, the method comprising:
   obtaining a property change for a source object property change, wherein a source property change value is not dependent on any other object properties;
   obtaining a pre-source change steady-state value for at least one object property dependent on the source object property, wherein a dependent user interface object property value is determined by an evaluation of a relational expression;
   generating a memory array containing array elements corresponding to the source object property and at least one dependent object property;
   for each array element in the array, generating additional array elements for each object property that depends from an array element, wherein each object property is linked to its dependent properties and wherein an object property may be represented by more than one array element;
   populating the array elements of the memory array with the pre-source change steady-state values for all object properties represented in the memory array;
   obtaining a post-source change steady-state value for at least one object property dependent on the source object property;
   populating the array elements of the memory array with the post-source change steady-state values for all object properties represented in the memory array;
   performing a breadth-first array iteration to eliminate any non-affected array elements;
   performing a depth-first array iteration to eliminate any duplicative array elements; and
   implementing any remaining dependent user interface object properties.

35. The method as recited in claim 34, wherein obtaining the source object property change includes obtaining from the software application program a value change for the source object property.

36. The method as recited in claim 34, wherein obtaining the pre-source change steady-state value includes evaluating each dependent object property relational expression to obtain an object property value.

37. The method as recited in claim 34, wherein obtaining the pre-source change steady-state value includes obtaining at least one cached object property value, wherein cached object property value corresponds to a previously evaluated relational expression.

38. The method as recited in claim 34, wherein obtaining the post-source change steady-state value includes evaluating each dependent object property relational expression with a to obtain an object property value.

39. The method as recited in claim 34 further comprising correlating back-dependency data for each array element in the memory array, wherein the back dependency data corresponds to array elements related to the same object.

40. The method as recited in claim 34, wherein performing a breadth-first array iteration includes, for each array element, determining whether the object property pre-source change steady-state value is equal to the object property post-source change steady-state value.

41. The method as recited in claim 40, wherein performing a breadth-first array iteration includes voiding any array element whose object property pre-source change steady-state value is equal to the object property post-source change steady-state value.

42. The method as recited in claim 41, wherein performing a breadth-first array iteration includes voiding any array elements linked to a voided array element.

43. The method as recited in claim 34, wherein performing a depth-first array iteration includes, for every non-void array element:
   determining whether any array elements in the memory array correspond to the same object property; and
   if one or more array elements correspond to the same object property, determining the most recent array element corresponding to the object property; and
   voiding any additional array elements corresponding to the object property.

44. The method as recited in claim 43, wherein determining the most recent array element includes iteratively com paring two array elements and voiding the least recent of the tow array elements.

45. The method as recited in claim 34, wherein implementing any remaining dependent object properties includes instantiating one or more objects with the post-source change object property values.

46. The method as recited in claim 34, wherein the objects include user interface objects.

47. A computer-readable medium having computer-executable instructions operable for performing the method as recited in claim 34.

48. A computer system having a processor and a memory, the computer system operable to perform the method as recited in claim 34.

* * * * *